(12) United States Patent
Ikeda (10) Patent No.: US 6,373,677 B1
(45) Date of Patent: Apr. 16, 2002

(54) CONTROL CIRCUIT FOR CONTROLLING A CURRENT IN AN ELECTROMAGNETIC COIL WITH A DUTY RATIO WHICH IS ADJUSTED IN RESPONSE TO VARIATION OF A POWER SOURCE VOLTAGE

(75) Inventor: Hideo Ikeda, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/430,185

(22) Filed: Oct. 29, 1999

(30) Foreign Application Priority Data

Oct. 29, 1998 (JP) .......................................... 10-307979

(51) Int. Cl.⁷ ............................................. H01H 47/00
(52) U.S. Cl. ...................................... 361/152; 361/154
(58) Field of Search .............................. 361/152–154, 361/159, 160, 170, 187; 417/222.1, 222.2, 269, 1–47; 251/129.04; 332/109

(56) References Cited

U.S. PATENT DOCUMENTS

| 4,102,150 A | 7/1978 | Kountz ......................... 62/209 |
| 4,132,086 A | 1/1979 | Kountz ......................... 62/209 |
| 4,424,682 A | 1/1984 | Miska et al. ................... 62/133 |
| 4,448,034 A | 5/1984 | Shimada et al. ................ 62/161 |
| 4,476,692 A | 10/1984 | Nishi et al. .................. 62/228.5 |
| 4,516,185 A | 5/1985 | Culligan et al. ............. 361/154 |
| 4,556,926 A | * 12/1985 | Yanagida ..................... 361/154 |
| 4,687,419 A | 8/1987 | Suzuki et al. ................ 417/222 |
| 4,697,221 A | 9/1987 | Pasquarella ................. 361/156 |
| 4,778,348 A | 10/1988 | Kikuchi et al. .............. 417/222 |
| 4,780,059 A | 10/1988 | Taguchi |
| 4,882,909 A | 11/1989 | Terauchi ...................... 62/209 |
| 4,909,043 A | 3/1990 | Masauji et al. ............... 62/158 |
| 4,978,865 A | * 12/1990 | Hartmann et al. .......... 307/140 |
| 5,065,589 A | 11/1991 | Taguchi ....................... 62/161 |
| 5,113,158 A | * 5/1992 | Tsuji et al. .................. 332/109 |
| 5,471,360 A | * 11/1995 | Ishikawa et al. ............ 361/154 |
| 5,691,889 A | 11/1997 | Bazinet et al. ................ 363/89 |
| 6,126,405 A | * 10/2000 | Kawaguchi et al. ..... 417/222.2 |

FOREIGN PATENT DOCUMENTS

| DE | 3129610 | 2/1983 |
| EP | 0309242 | 3/1989 |
| EP | 0669457 | * 3/1993 |
| EP | 0669457 | 8/1995 |
| GB | 2153922 | 8/1985 |
| JP | 57175422 | 10/1982 |
| JP | 6155380 | 3/1986 |
| JP | 1192832 | 4/1999 |
| JP | 11107929 | 4/1999 |

* cited by examiner

Primary Examiner—Michael J. Sherry
(74) Attorney, Agent, or Firm—Baker Botts L.L.P.

(57) ABSTRACT

In a control circuit for controlling a coil current flowing in an electromagnetic coil (21a) connected to a power source (73), a current processing circuit (72, 75, 76, 77) is connected to the power source to process the coil current into a pulse current with a duty ratio. For adjusting the duty ratio in response to variation of a voltage of the power source, a ratio adjusting circuit (79, 80, 81) is connected to the power source and the current processing circuit. The electromagnetic coil is included in a displacement control valve for varying a displacement of a variable displacement compressor.

12 Claims, 5 Drawing Sheets

FIG. 1 RELATED ART

FIG. 2
PREVIOUS TECHNIQUE

CONTROL CIRCUIT FOR CONTROLLING A CURRENT IN AN ELECTROMAGNETIC COIL WITH A DUTY RATIO WHICH IS ADJUSTED IN RESPONSE TO VARIATION OF A POWER SOURCE VOLTAGE

BACKGROUND OF THE INVENTION

The present invention relates to a variable displacement compressor including a displacement control valve and, more particularly, to a control circuit for controlling operation of the displacement control valve.

Such a variable displacement compressor is filed as Japanese Patent Application No. 9-260345 on Sep. 25, 1997 and disclosed as Japanese Patent Laid-Open No. 11-93832 on Apr. 6, 1999. The variable displacement compressor includes a plurality of pistons and a crank mechanism for driving the pistons in a crankcase. When the pistons are driven through the crank mechanism, a refrigerant gas is moved from a suction chamber to a discharge chamber with being compressed by each of the pistons.

The variable displacement compressor has a communication passage communicating the discharge chamber with the crank chamber and further includes a displacement control valve for opening and closing the communication passage.

Such a displacement control valve is filed as Japanese Patent Application No. 9-271516 on Oct. 3, 1997 and disclosed as Japanese Patent Laid-open No. 11-107929 on Apr. 20, 1999. The displacement control valve comprises a valve element placed in the communication passage and an electromagnetic coil or solenoid which is for driving the valve element by the use of an electric current applied from a power source thereto. When the valve element is driven to open the communication passage, the refrigerant gas is introduced from the discharge chamber into the crank chamber. When the valve element is driven to close the communication passage, the refrigerant gas is prohibited the introduction from the discharge chamber into the crank chamber. Thus, the displacement control valve controls the differential pressure between the crank chamber and the suction chamber. Therefore, the variable displacement compressor has a variable displacement which is controlled in response to the differential pressure.

The electromagnetic solenoid may be duty controlled by a control circuit in the manner known in the art. In this event, the displacement control valve can be controlled in a stable manner when the power source has a voltage which is stable.

It is assumed as a particular case that the voltage of the power source is unstable. In the particular case, it is not possible to control the displacement control valve in a stable manner. As a result, it becomes not possible to achieve stable control of the discharge capacity or displacement of the variable displacement compressor.

SUMMARY OF THE INVENTION

It is an object of the present invention to provide control circuit for controlling a current in an electromagnetic coil with a duty ratio which is adjusted in response to variation of a power source voltage.

It is another object of the present invention to provide a control circuit for a displacement control valve included in a variable displacement compressor, which can control operation of the displacement control valve in a stable fashion even when a power source has an unstable voltage.

Other objects of the present invention will become clear as the description proceeds.

According to the present invention, there is provided a control circuit for controlling a coil current flowing in an electromagnetic coil connected to a power source. The electromagnetic coil is included in a displacement control valve for varying a displacement of a variable displacement compressor. The control circuit comprises a current processing circuit connected to the power source for processing the coil current into a pulse current with a duty ratio and a ratio adjusting circuit connected to the power source and the current processing circuit for adjusting the duty ratio in response to variation of a voltage of the power source.

DESCRIPTION OF THE PREFERRED EMBODIMENTS

Figure 1:
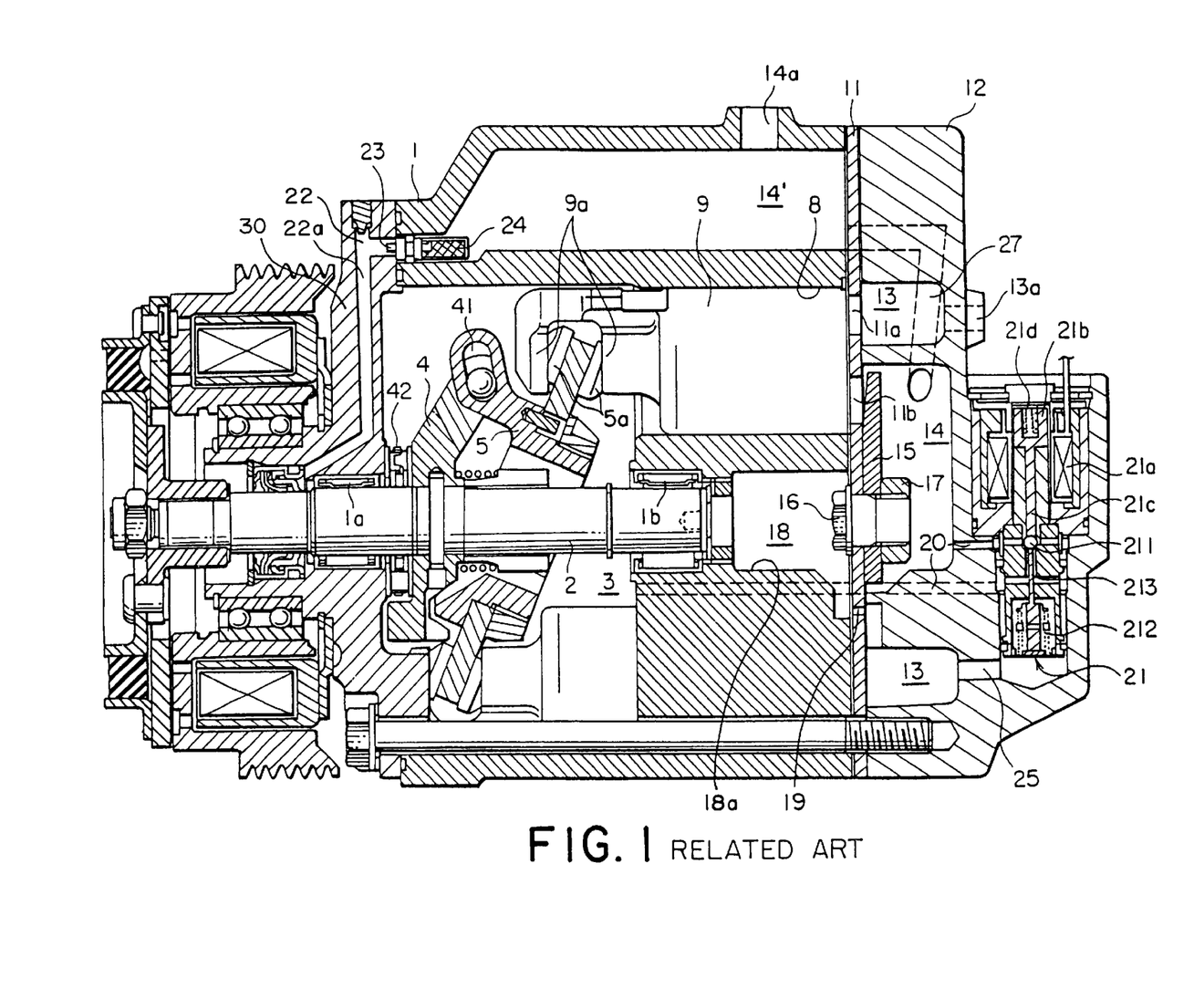
FIG. 1 is a sectional view of a variable displacement compressor according to a related art, the variable displacement compressor including a displacement control valve.

With reference to FIG. 1, description will be made at first as regards a variable displacement compressor according to a related art.

The compressor is so-called a single swash plate type variable displacement and is suitable for use in an automobile air conditioning device. The compressor is described in Japanese Patent Laid-Open No. 11-93832 and comprises a compressor casing 1 having a through hole at he center thereof. A main shaft 2 is inserted into this through hole and rotatably supported by the casing 1 via bearings 1a and 1b.

The casing 1 defines therein a crank chamber 3 herein a rotor 4 is mounted on the main shaft 2. A swash late 5 is coupled to the rotor 4 via a hinge mechanism 41. The main shaft 2 passes through the swash plate 5 such that the swash plate 5 abuts the main shaft 2 at an inner periphery thereof so as to be slidable relative to the main shaft 2. An inclination of the swash plate 5 relative to the main shaft 2 can be changed by means of the hinge mechanism 41.

In the variable displacement compressor, the casing 1 is formed with a plurality of cylinders 8 which are arranged at regular angular intervals so as to surround the main shaft 2. Pistons 9 are disposed in the cylinders 8, respectively, and coupled to a swash plate 5 through sliding shoes 5a attached to both sides of the swash plate 5. Each of the sliding shoes 5a has a spherical surface. Each piston 9 has at one end thereof a holding portion 9a which holds the sliding shoes 5a in a sandwiched fashion so as to be slidable on the surfaces of the sliding shoes 5a. With this arrangement, when the swash plate 5 rotates following the rotation of a rotor 4, the rotation of the swash plate 5 is converted into reciprocating motions of the pistons 9. The piston stroke is proportional to the inclination of the swash plate 5.

To a right end surface in the figure of the casing 1, a cylinder head 12 is attached via a valve plate 11 interposed therebetween, so as to close a right-side open end of the casing 1. The casing 1 and the cylinder head 12 constitute a compressor housing. The cylinder head 12 is formed with a suction chamber 13 and a discharge chamber 14. The suction chamber 13 communicates with a suction port 13a, while the discharge chamber 14 communicates with a discharge port 14a (described later). The discharge chamber 14 communicates with a hollow cavity 14' defined in the interior of the casing 1 through a communication path 27 formed in the cylinder head 12. Thus, the hollow cavity 14' substantially forms a part of the discharge chamber. The casing 1 is provided with a discharge port 14a formed in a side wall thereof at a position corresponding to the hollow cavity 14'. The valve plate 11 is formed with suction holes 11a and discharge holes 11b. The suction chamber 13 and the discharge chamber 14 communicate with the cylinders 8 via the suction holes 11a and the discharge holes 11b, respectively.

At the center of the valve plate 11, a suction valve (not shown), a discharge valve (not shown) and a valve retainer 15 are fixedly mounted by means of a bolt 16 and a nut 17.

The compressor comprises a first communication passage 18 which is for establishing communication between the crank chamber 3 and the suction chamber 13. The first communication passage 18 is formed by a combination of a hollow cavity 18a at a rear of the main shaft 2 (to the right of the drawing), gaps between the main shaft 2 and the bearing 1b, and a first orifice 19 formed through the valve plate 11. The first orifice 19 has a fixed opening so that the amount of gas flowing out from the crank chamber 3 into the suction chamber 13 is controlled thereby.

On the other hand, a pressure control valve 21 is disposed in a second communication passage 20 establishing communication between the discharge chamber 14 and the crank chamber 3. By open/close controlling the pressure control valve 21, the amount of discharge gas introduced from the discharge chamber 14 into the crank chamber 3 is adjusted.

The compressor further comprises a third communication passage 22 which is for establishing communication between the hollow cavity 14', i.e., the discharge chamber 14 and the crank chamber 3 to bypass the second communication passage 20. The third communication passage 22 is formed by a combination of a through hole 22a formed in a front housing 30, gaps between the main shaft 2 and the bearing 1a, and gaps between a bearing 42 and the front housing 30.

A second orifice 23 with a fixed opening is provided in the third communication passage 22. A filter 24 is disposed at an inlet side of the second orifice 23.

Now, the description will be directed to a structure of the pressure control valve 21.

The pressure control valve 21 comprises a valve member 211 for opening and closing the communication passage 20 and a bellows 212. The inside of the bellows 212 is under vacuum and provided with a spring. The bellows 212 is sensitive to a pressure in the suction chamber 13 via a communication passage 25. A transfer rod 213 is attached to the bellows 212 and operates the valve member 211 in response to expansion and contraction of the bellows 212 so as to open and close the communication passage 20.

The pressure control valve 21 is further provided with an electromagnetic coil 21a confronting the bellows 212, and a plunger 21b surrounded by the electromagnetic coil 21a. The plunger 21b is slidable relative to the electromagnetic coil 21a and fixed with a transfer rod 21c at its tip. The plunger 21b is provided with a spring 21d so that the transfer rod 21c presses the valve member 211 in a closing direction depending on an electromagnetic force of the electromagnetic coil 21a and a biasing force of the spring 21d.

Specifically, the pressure control valve 21 carries out an open/close control of the valve member 211 in response to the pressure in the suction chamber 13 monitored by the bellows 212. And, a set pressure of the pressure control valve 21 changes depending on the amount of current supplied to the electromagnetic coil 21a.

Figure 2:
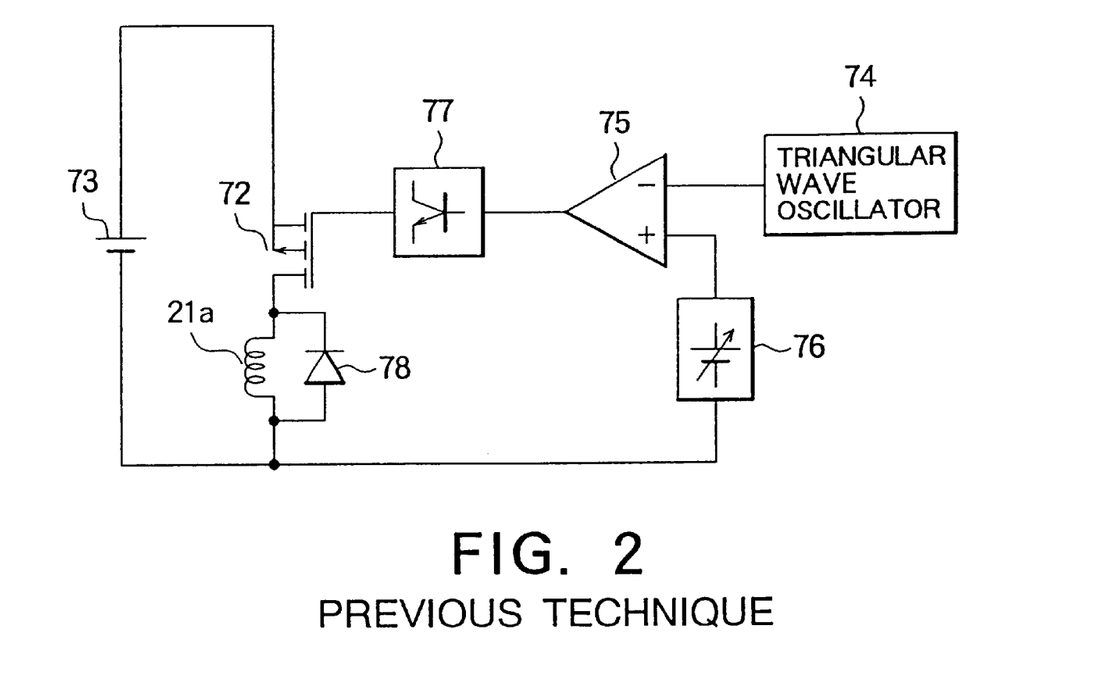
FIG. 2 is a circuit diagram of a control circuit in a previous technique, the control circuit being usable for driving the displacement control valve.

With reference to FIG. 2, the description is made as regards a control circuit in a previous technique. The control circuit is usable for driving the above-mentioned displacement control valve. More particularly, the control circuit controls the value of the electric current that is applied to the electromagnetic coil 21a connected between positive and negative electrodes of a DC power source 73. The control circuit comprises a semiconductor-switching element 72 connected between the positive electrode of the DC power source 73 and the electromagnetic coil 21a. The semiconductor-switching element 72 has operation which will later become clear. A return current diode 78 is connected parallel to the electromagnetic coil 21a between the semiconductor-switching element 72 and the negative electrode of the DC power source 73. The return current diode 78 serves to prevent overvoltage from reaching the switching element 72 when the semiconductor switching element 72 is turned off, thereby preventing damage to the semiconductor switching element 72.

In the manner which will presently be described, the control circuit further comprises a triangular wave oscillator 74, a first or PWM comparator 75, a voltage-adjusting circuit 76, and an element-driving circuit 77.

The triangular wave oscillator 74 is connected to an inverse input side of the PWM comparator 75 and is for applying, as an inverse input, a triangular wave output voltage of a prescribed frequency to the inverse input side. The voltage-adjusting circuit 76 is connected between the DC power source 73 and a non-inverse input side of the PWM comparator 75 and is for producing an adjusted voltage in response to the voltage of the DC power source 73. The voltage-adjusting circuit 76 applies, as a non-inverse input, the adjusted voltage to the non-inverse input side of the PWM comparator 75. The adjusted voltage is adjustable by a device controller which is included in the air conditioning device. The PWM comparator 75 compares the triangular wave output voltage and the adjusted voltage to each other to produce a comparison value. Furthermore, the PWM comparator 75 outputs a square wave voltage of the prescribed frequency having an ON pulse width corresponding to the comparison value. The greater the adjusted voltage, the greater the width of the ON pulse in the square wave output voltage. The element-driving circuit 77 is connected between the semiconductor-switching element 72 and the PWM comparator 75. The square wave voltage is supplied to the semiconductor switching element 72 via the element-driving circuit 77.

The semiconductor switching element 72 is switched on and off in accordance with the square wave output voltage to allow a square wave current or a pulse current of the prescribed frequency flowing as a coil current in the electromagnetic coil 21a. The greater the width of the ON pulse in the square wave output voltage from the PWM comparator 75, the greater the width of the ON pulse in the square wave current flowing in the electromagnetic coil 21a, and hence the greater the duty ratio of the pulse current flowing in the electromagnetic coil 21a and the greater the average current therein. The narrower the width of the ON pulse in the square wave output voltage of the PWM comparator 75, the narrower the width of the ON pulse in the square wave current flowing in the electromagnetic coil 21a, and hence the smaller the duty ratio of the pulse current flowing in the electromagnetic coil 21a and the smaller the average current therein.

As the foregoing description reveals, the duty ratio of the pulse current flowing in the electromagnetic coil 21a is controlled by controlling the voltage-adjusting circuit 76, thereby controlling the average current in the electromagnetic coil 21a and hence, ultimately, controlling the discharge capacity of the variable displacement compressor.

When the power source voltage 73 is stable, the average current flowing in the electromagnetic coil 21a can be controlled by regulating the voltage-adjusting circuit 76 in order to control the duty ratio of the current flowing in the electromagnetic coil 21a of the pressure control valve 21. Therefore, the operation of the displacement control valve can be controlled in a stable manner.

However, when there is a variation in the power source voltage 73, then the current value of the ON pulse in the square wave voltage flowing in the electromagnetic coil 21a will vary, causing the average current flowing in the electromagnetic coil 21a to vary. Consequently, if the power source voltage 73 is unstable, it is not possible to control the operation of the displacement control valve in a stable manner, and hence it is not possible to achieve stable control of the discharge capacity of the variable displacement compressor.

Figure 3:
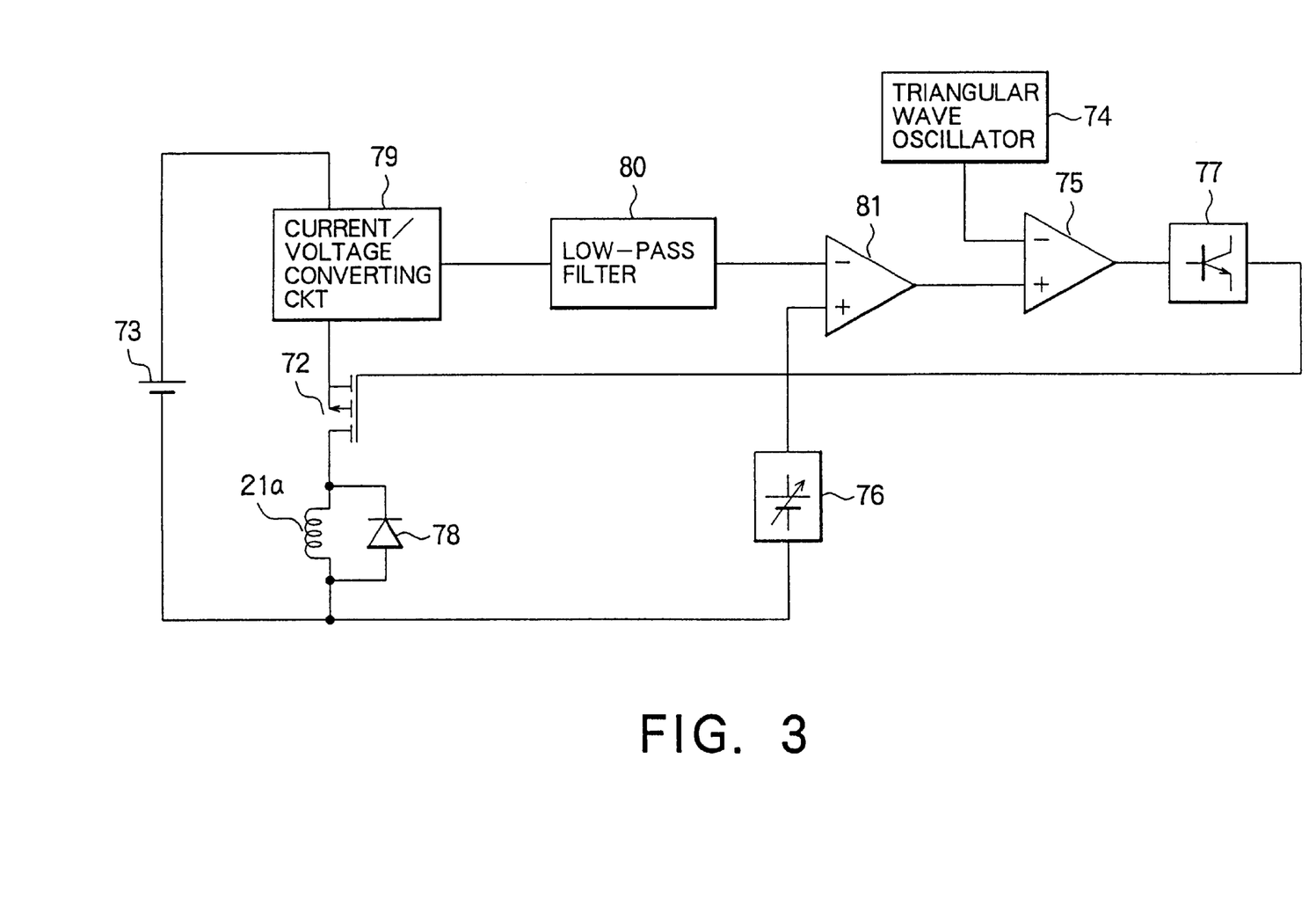
FIG. 3 is a circuit diagram of a control circuit according to a first embodiment of the present invention, the control circuit being usable for the displacement control valve.

With reference to FIG. 3, the description will be now made as regards a control circuit according to a first embodiment of the present invention. The control circuit comprises similar parts designated by like reference numerals.

In the manner which will presently be described, the control circuit further comprises a current/voltage converting circuit 79, a low-pass filter 80, and a second or differential amplifier 81. The current/voltage converting circuit 79 is connected between the semiconductor switching element 72 and the positive electrode of the DC power source 73 and is for converting the pulse current flowing in the electromagnetic coil 21a into a pulse voltage. The current/voltage converting circuit 79 may be a converting circuit using a shunt resistance, or the like. The low-pass filter 80 is connected to the current/voltage converting circuit 79 and is for converting the pulse voltage into a DC voltage. The differential amplifier 81 has an inverse input terminal, a non-inverse input terminal, and an output terminal connected to the non-inverse side of the PWM comparator 75. The inverse input terminal of the different amplifier 81 is connected to the low-pass filter 80 and is for being supplied with the DC voltage from the low-pass filter 80. The non-inverse input terminal of the different amplifier 81 is connected to the voltage-adjusting circuit 76 and is for being supplied with, as a specific voltage, the adjusted voltage from the voltage-adjusting circuit 76. In the manner known in the art, the differential amplifier 81 produces, as a particular voltage, an output voltage to supply the output voltage as the non-inverse input through the output terminal thereof to the non-inverse side of the PWM comparator 75.

The DC voltage supplied to the inverse input terminal of the differential amplifier 81 increases or decreases in response to any increase or decrease in the average current of the pulse current flowing in the electromagnetic coil 21a. Therefore, when the adjusted voltage is uniform, the output voltage of the differential amplifier 81 will decrease or increase in response to increase or decrease of the average current of the pulse current flowing in the electromagnetic coil 21a, respectively.

The ON pulse width of the output square wave voltage from the PWM comparator 75 increases and decreases in response to any increase and decrease in the output voltage of the differential amplifier 81 input to the non-inverse input side of the PWM comparator 75. Therefore, the ON pulse width of the output square wave voltage from the PWM comparator 75 will decrease if the average current of the pulse current flowing in the electromagnetic coil 21a increases. On the other hand, the ON pulse width of the output square wave voltage from the PWM comparator 75 will increase if the average current of the pulse current flowing in the electromagnetic coil 21a decreases.

Consequently, if the DC power source 73 has a voltage increased, the duty ratio of the pulse current flowing in the electromagnetic coil 21a will decrease. Therefore, the increase in the average current caused by the increase in the voltage of the DC power source 73 is cancelled out by a decrease in the average current flowing in the electromagnetic coil 21a, due to the decrease in the duty ratio of the pulse current. If the voltage of the DC power source 73 has decreased, then the duty ratio of the pulse current flowing in the electromagnetic coil 21a increases. Therefore, the decrease in the average current caused by the decrease in the voltage of the DC power source 73 is cancelled out by an increase in the average current flowing the electromagnetic coil 21a, due to the increase in the duty ratio of the pulse current. Consequently, even if the voltage of the DC power source 73 is unstable, the average current flowing in the electromagnetic coil 21a will be stable, and hence the displacement control valve will operate in a stable fashion. Therefore, it is possible to achieve stable control of the discharge capacity of a variable displacement compressor.

Figure 4:
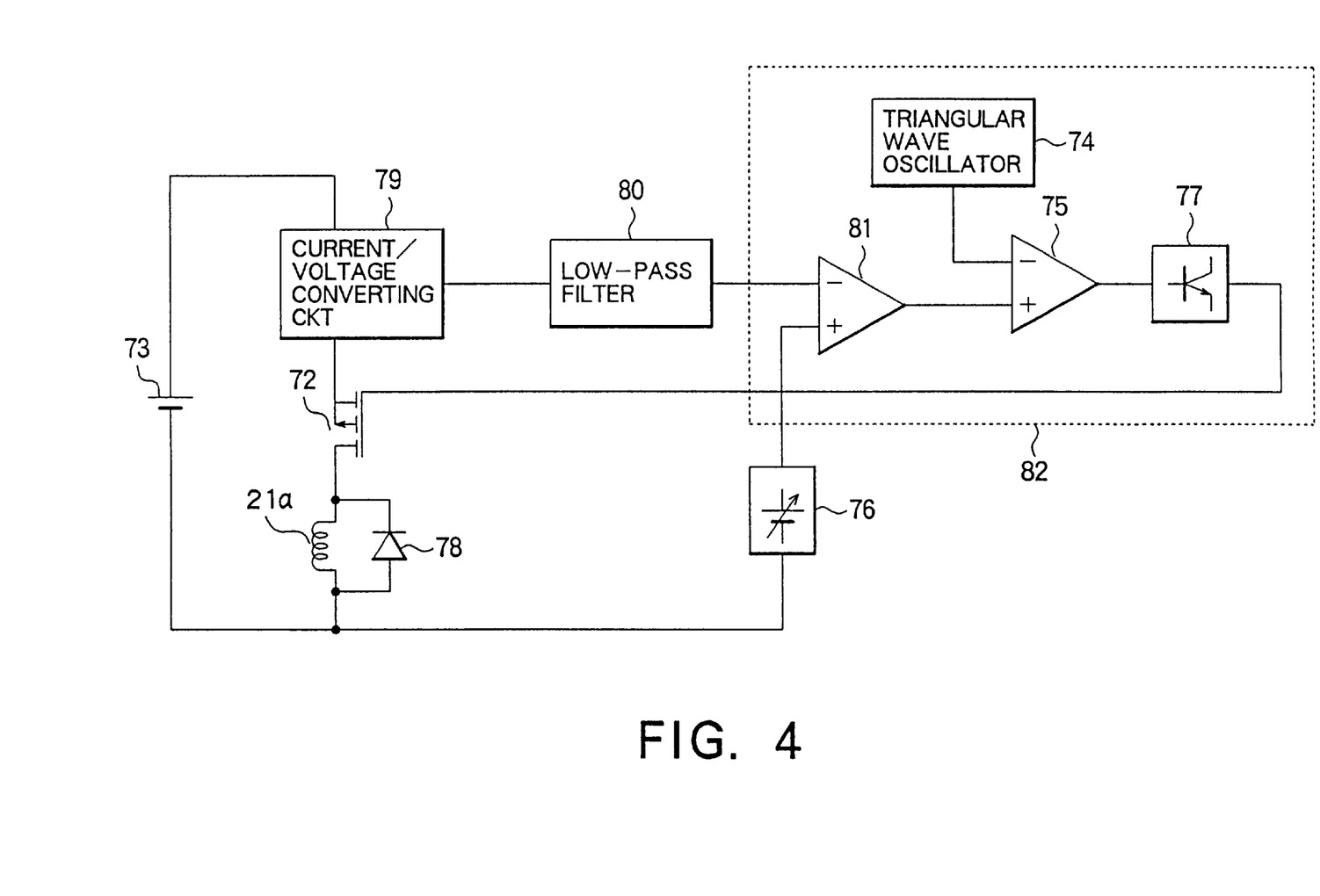
FIG. 4 is a circuit diagram of a control circuit according to a second embodiment of the present invention, the control circuit being usable for the displacement control valve.

With reference to FIG. 4, the description will be directed to a control circuit according to a second embodiment of the present invention. The control circuit comprises similar parts designated by like reference numerals.

In the control circuit, the differential amplifier 81, the triangular wave oscillator 74, the PWM comparator 75, and the element-driving circuit 77 are collectively constituted in a switching power source control IC 82 known in the art. With this structure, the control circuit can be compactified.

Figure 5:
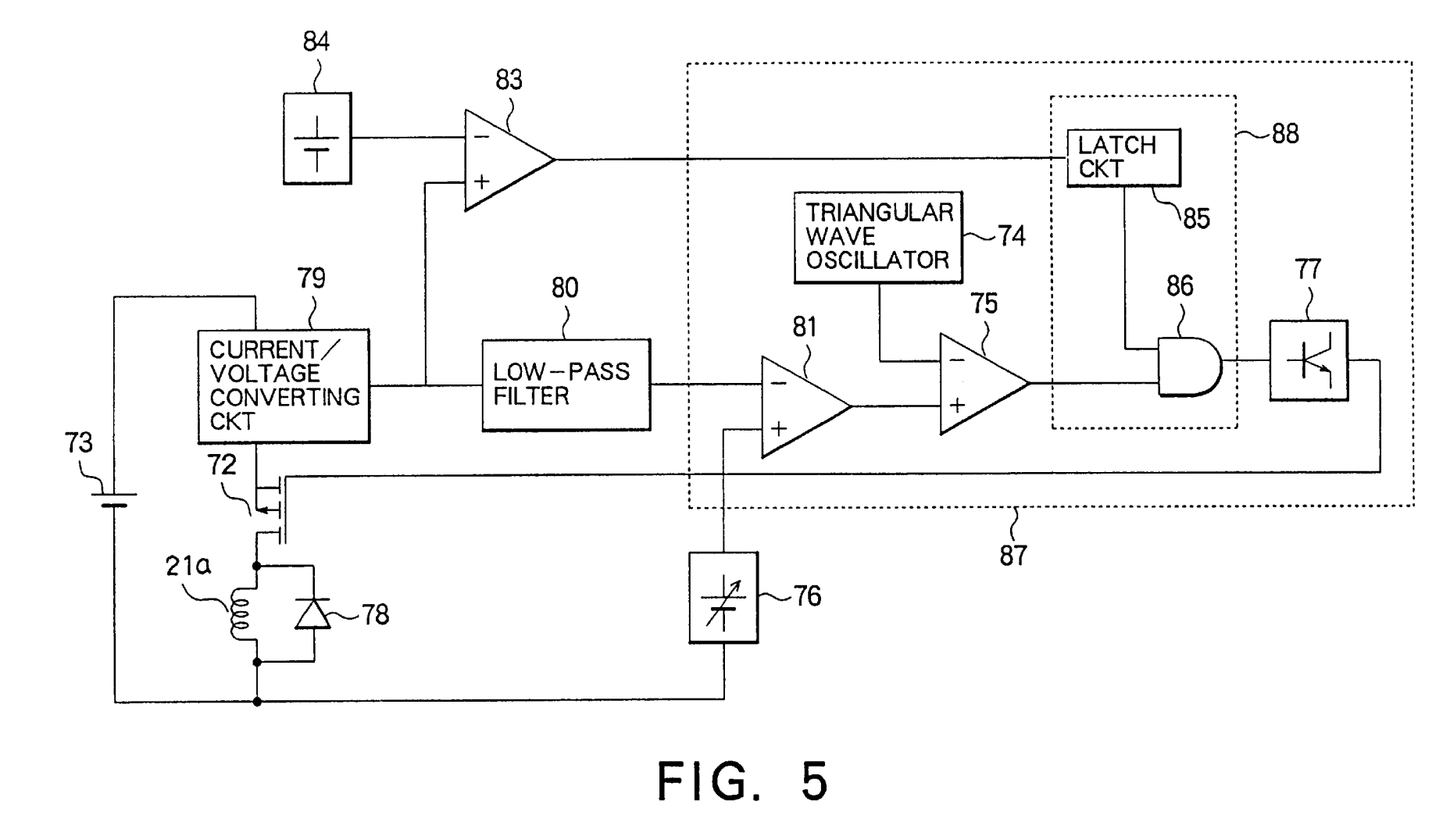
FIG. 5 is a circuit diagram of a control circuit according to a third embodiment of the present invention, the control circuit being usable for the displacement control valve.

With reference to FIG. 5, the description will be made as regards a control circuit according to a third embodiment of the present invention. The control circuit comprises similar parts designated by like reference numerals.

In the manner which will presently be described, the control circuit further comprises a third or overcurrent comparator 83, a reference voltage generating circuit 84, a latch circuit 85, and an AND circuit 86. The overcurrent comparator 83 has an inverse input side, a non-inverse input side, and an output side. The inverse input side of the overcurrent comparator 83 is connected to the reference voltage generating circuit 84 and is supplied with a reference voltage generated in the reference voltage generating circuit 84. The non-inverse input side of the overcurrent comparator 83 is connected to the current/voltage converting circuit 79 and is supplied with the pulse voltage from the current/voltage converting circuit 79. Responsive to the reference voltage and the pulse voltage, the overcurrent comparator 83 produces an output voltage in the manner known in the art. The latch circuit 85 is connected to the output side of the overcurrent comparator 83 and is for producing a latch output in response to the output voltage of the overcurrent comparator 83. The AND circuit 86 has a first input, a second input, and an output terminals. The first input terminal of the AND circuit 86 is connected to the latch circuit 85 and is supplied with the latch output. The second input terminal of the AND circuit 86 is connected to the PWM comparator 75 and is supplied with the square wave voltage. The output terminal of the AND circuit 86 is connected to the element-driving circuit 77. Responsive to the latch output and the square wave voltage, the AND circuit 86 produces an AND output which is supplied as the square wave voltage of the prescribed frequency to the element-driving circuit 77 through the output terminal of the AND circuit 86. As a result, the square wave voltage is supplied to the semiconductor switching element 72. A combination of the latch circuit 85 and the AND circuit 86 serves as a protective circuit 88 for protecting the semiconductor switching element 72 from overcurrent thereof.

When an overcurrent exceeding the reference current flows in the electromagnetic coil 21*a*, the output voltage from the current/voltage converting circuit 79 exceeds the reference voltage set in the reference voltage generating circuit 84, and hence the output of the overcurrent comparator 83 will be "1". Even if the input to the latch circuit 85 instantly becomes "1", the output from the latch circuit 85 will remain at "0". When the input to the one side of the AND circuit 86 becomes "0", the output of the AND circuit 86 turns to "0" and the supply of the square wave pulse voltage to the semiconductor switching element 72 is interrupted, whereupon the current flowing in the electromagnetic coil 21*a* is halted. Consequently, this prevents an overcurrent flowing in the semiconductor switching element 72, and causing damage to the semiconductor switching element 72, if the electromagnetic coil 21*a* shorts.

It is a matter of course the differential amplifier 81, the triangular wave oscillator 74, the PWM comparator 75, the element-driving circuit 77, the latch circuit 85, and the AND circuit 86 may be constituted in a switching power source control IC 87 known in the art. With this structure, the control circuit can be made more compact.

In each of the control circuits described above, when the power source voltage increases, the duty ratio of the pulse current flowing in the electromagnetic coil 21*a* decreases. Therefore, the increase in the average current flowing in the electromagnetic coil 21*a* due to the increase in the voltage of the DC power source 73 is cancelled out by a corresponding decrease in the average current flowing in the electromagnetic coil 21*a*. Moreover, when the voltage of the power source 73 has decreased, the duty ratio of the pulse current flowing in the electromagnetic coil 21*a* increases. Therefore, the decrease in the average current flowing in the electromagnetic coil 21*a* is cancelled out by a corresponding increase in the average current flowing in the electromagnetic coil 21*a* of the pressure control valve 21. Consequently, the average current flowing in the electromagnetic coil of the pressure control valve 21 is stable, and the pressure control valve 21 operates in a stable fashion, even if the power source voltage to the pressure control valve 21 is unstable. Therefore, by adopting the control circuit relating to the present invention, the operation of the displacement control valve can be controlled in a stable fashion, and hence stable control of the discharge capacity of a variable displacement compressor can be achieved.

In each of the control circuits of FIGS. 3–5, it is to be noted that a combination of the semiconductor switching element 72, the triangular wave oscillator 74, the PWM comparator 75, the voltage-adjusting circuit 76, and the element-driving circuit 77 is referred to as a current processing circuit and that a combination of the current/voltage converting circuit 79, the low-pass filter 80, and the differential amplifier 81 is referred to as a ratio adjusting circuit.

While the present invention has thus far been described in connection with a few embodiments thereof, it will readily be possible for those skilled in the art to put this invention into practice in various other manners. For example, it is also possible to adopt a composition whereby the duty ratio of the pulse current flowing in the electromagnetic coil of the pressure control valve is controlled by regulating the voltage-adjusting circuit, in such a manner that it cancels out fluctuation in the average current flowing in the electromagnetic coil caused by fluctuation of the voltage of the DC power source, on the basis of a control program stored in storage means provided in the control device of an air conditioning device.

What is claimed is:

1. A control circuit for controlling a coil current flowing in an electromagnetic coil connected to a power source, said electromagnetic coil being included in a displacement control valve for varying a displacement of a variable displacement compressor, said control circuit comprises:
   a current processing circuit connected to said power source for processing said coil current into a pulse current with a duty ratio; and
   a ratio adjusting circuit connected to said power source and said current processing circuit for adjusting said duty ratio in response to variation of a voltage of said power source.

2. A control circuit as claimed in claim 1, wherein said current processing circuit comprises:
   a triangular wave oscillator generating a triangular wave output voltage;
   a first comparator connected to said triangular wave oscillator for comparing said triangular wave output voltage with a particular voltage to produce a square wave voltage; and
   a switching element connected to said first comparator and said power source and responsive to said square wave voltage for controlling said coil current to allow a square wave current as said pulse current flowing in said electromagnetic coil.

3. A control circuit as claimed in claim 2, wherein said current processing circuit further comprises an element-driving circuit inserted between said first comparator and said switching element for supplying said square wave voltage from said first comparator to said switching element.

4. A control circuit as claimed in claim 2, wherein said current processing circuit further comprises a voltage-adjusting circuit connected between said power source and said first comparator for processing said voltage of the power source into said particular voltage.

5. A control circuit as claimed in claim 2, further comprising a protective circuit connected to said current processing circuit for protecting said switching element from overcurrent thereof.

6. A control circuit as claimed in claim 2, wherein said ratio adjusting circuit comprises:
   a current/voltage converting circuit connected to said power source for converting said pulse current into a pulse voltage;
   a low-pass filter connected to said current/voltage converting circuit for converting said pulse voltage into a DC voltage; and
   a second comparator connected to said low-pass filter and said first comparator for comparing said DC voltage with a specific voltage to produce said particular voltage.

7. A control circuit as claimed in claim 6, wherein said current processing circuit further comprises a voltage-adjusting circuit connected between said power source and said second comparator for processing said voltage of the power source into said specific voltage.

8. A control circuit as claimed in claim 6, wherein said current processing circuit further comprises an element-driving circuit inserted between said first comparator and said switching element for supplying said square wave voltage from said first comparator to said switching element.

9. A control circuit as claimed in claim 8, wherein said triangular wave oscillator, said first comparator, said second comparator, and said element-driving circuit are located on a single integrated circuit.

10. A control circuit as claimed in claim 6, further comprising:
 a reference voltage generating circuit for generating a reference voltage;
 a third comparator connected to said reference voltage and said current/voltage converting circuit for comparing said reference voltage with said pulse voltage to produce an output voltage;
 a latch circuit connected to said third comparator for producing a latch output in response to the output voltage; and
 an AND circuit connected to said latch circuit, said first comparator, and said switching element for producing an AND output in response to said latch output and said square wave voltage to supply said AND output to said switching element.

11. A control circuit as claimed in claim 10, wherein said current processing circuit further comprises an element-driving circuit inserted between said AND circuit and said switching element for supplying said AND output from said AND circuit to said switching element.

12. A control circuit as claimed in claim 11, wherein said triangular wave oscillator, said first comparator, said second comparator, said element-driving circuit, said latch circuit, and said AND circuit are located on a single integrated circuit.

* * * * *